June 2, 1931. A. R. ULP 1,808,086
MOUNTING FOR AUTOMOBILE GLARE SHIELDS
Filed Aug. 5, 1929
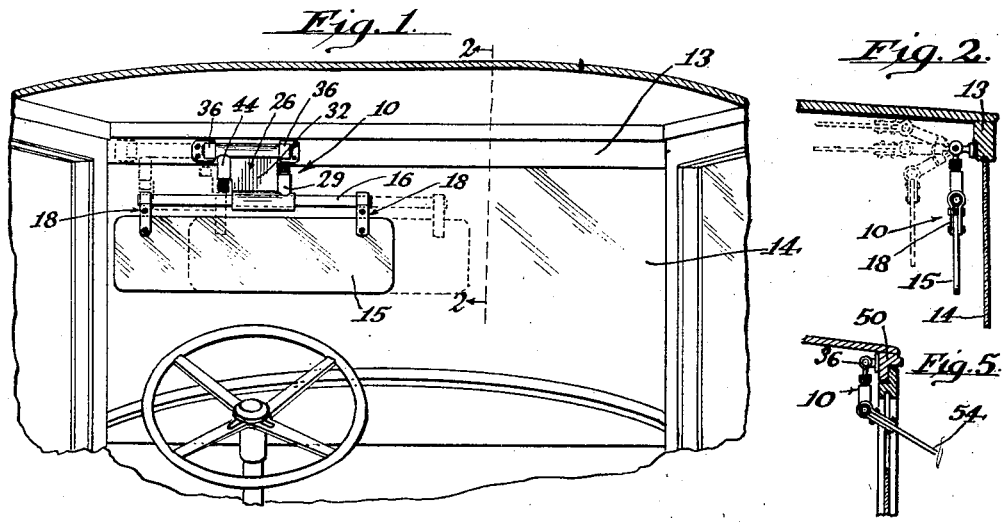
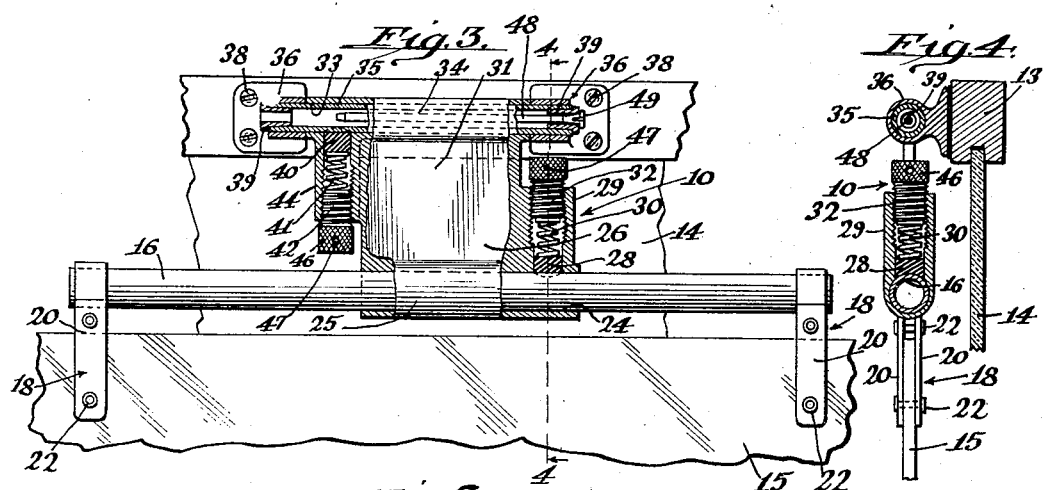
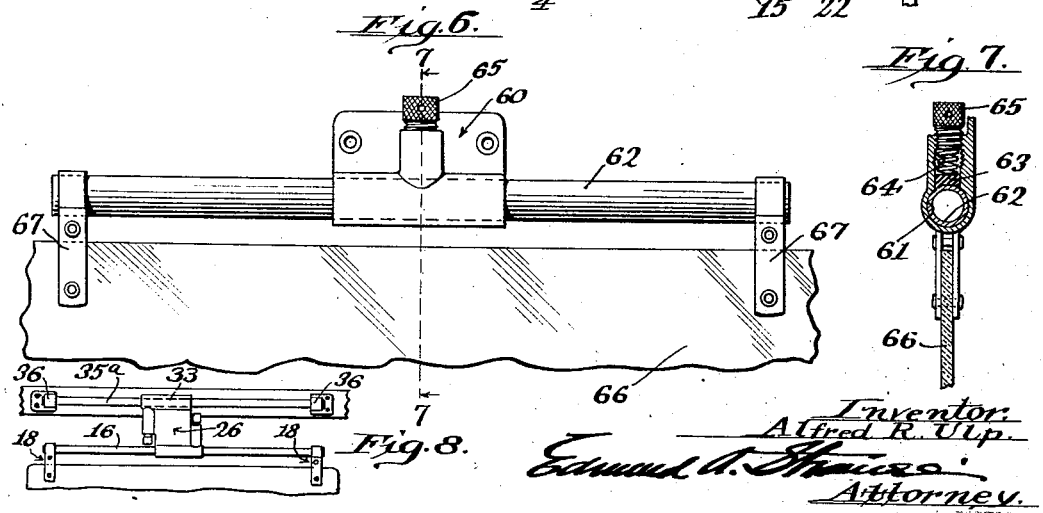
Inventor:
Alfred R. Ulp.
Edward A. Shores
Attorney.

Patented June 2, 1931

1,808,086

UNITED STATES PATENT OFFICE

ALFRED R. ULP, OF ALTADENA, CALIFORNIA

MOUNTING FOR AUTOMOBILE GLARE SHIELDS

Application filed August 5, 1929. Serial No. 383,698.

This invention relates to automobile accessories and more particularly to glare shields and sun shades.

The object of this invention is to provide a mounting for glare shields which may be easily and quickly adjusted to any desired angle and which will retain the glare shield in the position to which it is adjusted regardless of vibration or road shocks of the vehicle.

Another object of this invention is to provide a mounting for sun shades which is adapted to be secured to the inside of the upper rail of an automobile body and so constructed that the sun shade may be swung outwardly through the window frame to any desired angle, or lateral position, or when out of use against the ceiling, the mounting being provided with friction means for retaining the sun shade in the position to which it is adjusted.

Another object of this invention is to provide a mounting for glare shields which will allow the glare shield to be raised or lowered in a perpendicular position.

A further object of this invention is to provide a mounting for glare shields which will permit the shield to be shifted horizontally across the face of the wind shield.

Further objects and advantages will be apparent from the following description, reference being had to the accompanying drawings, in which:

Fig. 1 is a view taken from the interior of an automobile looking forward, showing the glare shield covering a portion of the wind shield and the mounting for the glare shield secured to the wind shield frame;

Fig. 2 is a fragmentary sectional view taken on line 2—2 of Fig. 1 also showing in dotted lines some of the positions to which the glare shield may be adjusted;

Fig. 3 is an enlarged front elevation of the glare shield mounting with a fragment of the glare shield secured thereto, parts being broken away and shown in section;

Fig. 4 is a sectional view taken on line 4—4 of Fig. 3;

Fig. 5 is a fragmentary sectional view taken through an automobile door showing the mounting when used in connection with sun shades;

Fig. 6 is a front elevation of a modified form of the invention;

Fig. 7 is a sectional view taken on line 7—7 of Fig. 6;

Fig. 8 is a front elevation of another modified form of the invention.

Referring by numerals to the drawings, the preferred form of mounting for either glare shields or sun shades is generally designated at 10 and is adapted to be secured to the upper rail 13 of the body structure above the wind shield 14 as shown in Figs. 1 and 2, and serves to carry a glare shield 15. The glare shield consists of a rectangular piece of colored glass or if desired formed of opaque material and is permanently secured to a horizontal tube 16 by clamps 18 each of which consists of a strap partially encircling the ends of the tube, the bifurcated ends 20 of which engage each side of the glare shield which is secured thereto by suitable fastening means designated at 22.

Tube 16 is slidably mounted in the bore 24 formed in the lower end 25 of a bracket generally designated at 26 and is frictionally engaged by a leather plug 28 in a cylinder 29. The plug 28 is held in frictional contact with the tube 16 by a coil spring 30 compressed by a screw 32 threaded into the upper end of the cylinder and is adapted to apply more or less tension on the plug.

The cylinder 29 is formed integral with a body portion 31 having a second bore 33 at its upper end 34 through which a tube 35 extends, the tube 35 projecting beyond each end of the bore and driven into openings formed in boxes 36 secured by screws 38 to the upper rail 13 of the body structure and is held against rotation in the boxes by ferrules 39 which are driven into and expand the ends of the tube into engagement with the bore in the boxes.

From the construction it will be seen that the glare shield may be tilted about the center of the tube 16 and that the body portion may swivel on the tube 35. In order to retain the body portion in elevated position as shown in dotted lines in Fig. 2 a friction plug 40, spring 41 and screw 42 of the same construction as that engaging the tube 16 are provided and are mounted in a cylinder 44 formed integral with the body portion.

Spring tension on the plugs 28 and 40 may be increased by adjusting the screws 32 and 42, these screws being provided with heads 46 which have openings 47 therein in order that the screws may be turned by a pin 48. This pin rests in the tube 35 when not in use and is held in place therein by a split head 49 adapted to frictionally engage the inner walls of the ferrule 39 as shown in Fig. 3.

Due to the slidable mounting of the tube 16 the glare shield may be shifted horizontally when necessary to avoid glare from the sun. The mounting may be placed adjacent one end of the wind shield frame as shown in dotted lines in Fig. 1, this being necessary in certain cases to avoid other fixtures or accessories previously mounted on the wind shield frame.

As shown in Fig. 5 the mounting is secured to the inner face of the upper side rail 50 of an automobile and serves to carry a sun shade 54 which may be swung out of the window frame or into the interior of the car adjacent the top when not in use, the construction of this mounting being exactly the same as above described in connection with glare shields.

A modified form of the invention is shown in Figs. 6 and 7 and consists of a bracket 60 having an opening 61 adapted to receive a tube 62 frictionally engaged by a plug 63 which is held under tension by a spring 64 compressed by a screw 65. The bracket may be secured to the body structure and a glare shield 66 connected to the bracket by straps 67.

Referring to Fig. 8 the bracket 26 is shown mounted on a tube 35ª which extends beyond each end of the bore 33 and is secured in the boxes 36 as previously described, the extended tube permits the bracket to be shifted to various positions along the tube, thus giving a wider range of movement than is possible when the boxes abut the ends of the bore as shown in Fig. 3.

This construction is particularly desirable for sun shade mountings for the windows of coupés or other types of enclosed automobiles having very wide side windows.

Although I have shown and described my invention in connection with glare shields and sun shades for automobiles, it will be understood that the mounting may be advantageously employed for other purposes, for instance a hinge for casement windows.

I claim:

1. A device of the character described comprising a bracket having a pair of parallel bores formed therein, a tube rotatable and slidable in one of the bores in said bracket, a second tube mounted in the other bore in said bracket and projecting from each end thereof, a box engaging each projecting end of said second tube and adapted to be secured to a fixed support, means for holding said second tube against rotation, and adjustable means carried by said bracket adapted to frictionally engage each of said tubes.

2. A device of the character described comprising a stationary tube adapted to be secured to a fixed support, a bracket having a bore formed therein rotatable and slidable on said tube, a second tube parallel to said stationary tube and rotatable and slidable in a second bore formed in said bracket, adjustable mechanisms carried by said bracket adapted to frictionally engage said stationary tube and said second tube, and a glare shield carried by said second tube.

3. A device of the character described comprising a bracket having a bore formed in its lower end, a tube extending through the bore, clamps secured to each end of said tube adapted to carry a glare shield, a second tube mounted in a bore formed in the upper end of said bracket and projecting from each end thereof, a box having an opening therein positioned on each of the projecting ends of said second tube, a ferrule in each end of said second tube adapted to hold said second tube against rotation, said boxes adapted to be secured to a stationary member of an automobile, a pair of cylinders carried by said bracket, a plug in each of said cylinders engaging the tubes in said bracket, a spring engaging each of said plugs, and a screw threaded into each of said cylinders adapted to compress said springs and apply pressure on said plugs.

In testimony whereof I affix my signature.

ALFRED R. ULP.